Aug. 14, 1956 — C. A. COWSERT — 2,758,410
FLOAT
Filed Sept. 21, 1953 — 2 Sheets-Sheet 1
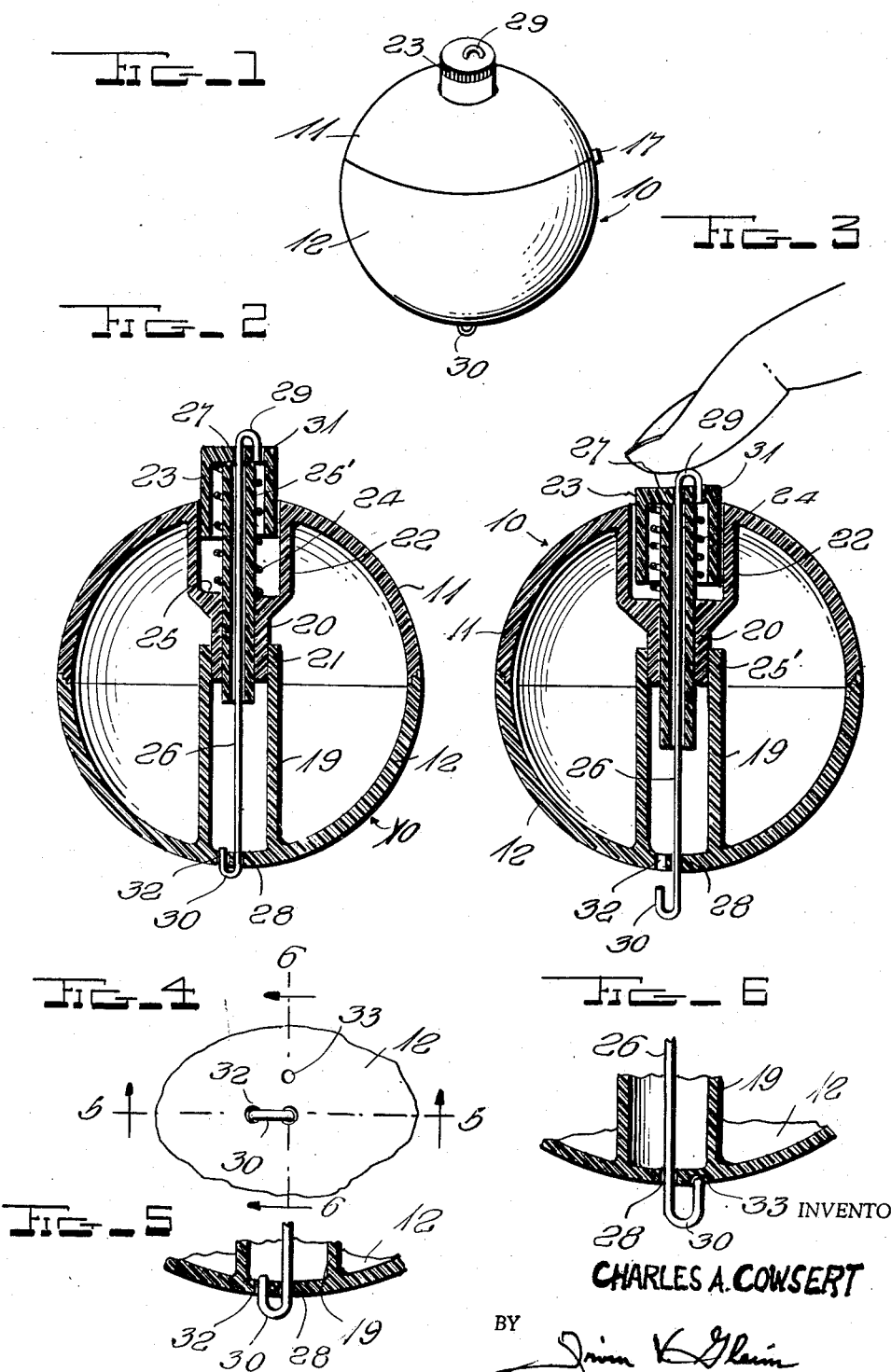
INVENTOR
CHARLES A. COWSERT
BY
ATTORNEY Aug. 14, 1956 C. A. COWSERT 2,758,410
FLOAT
Filed Sept. 21, 1953 2 Sheets-Sheet 2
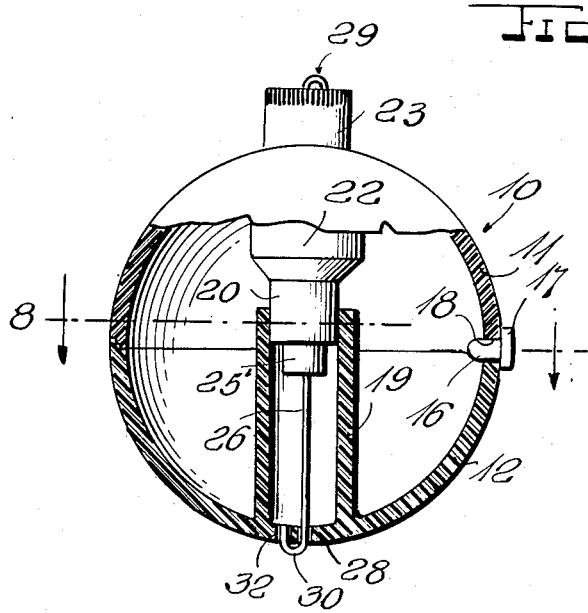
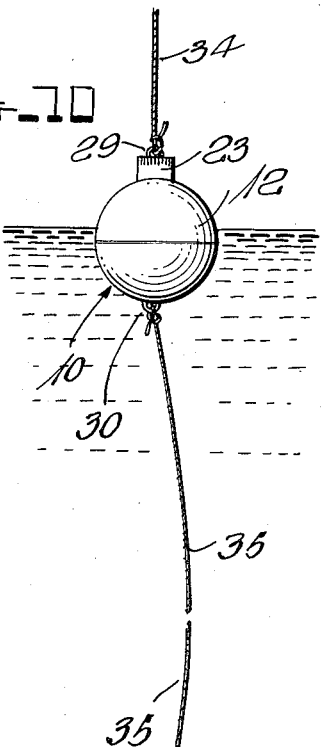
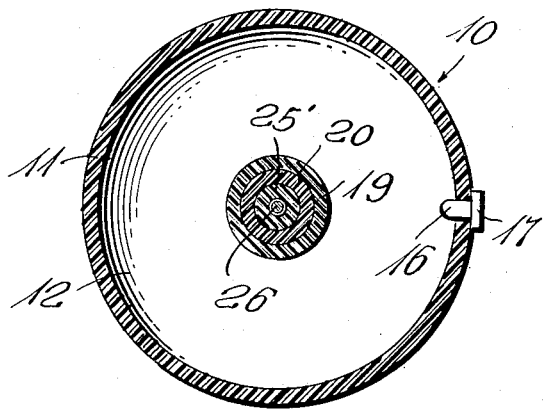
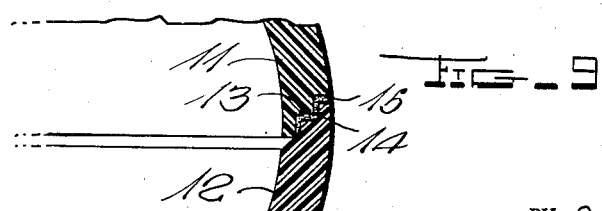
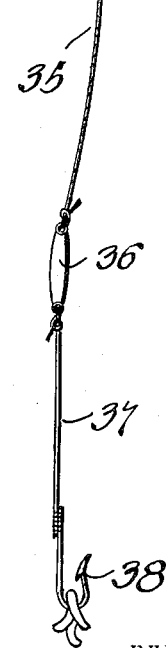
INVENTOR
CHARLES A. COWSERT
BY
ATTORNEY United States Patent Office 2,758,410
Patented Aug. 14, 1956

2,758,410

FLOAT

Charles A. Cowsert, Miamisburg, Ohio, assignor to Buckeye Bait Corporation, Miamisburg, Ohio, a corporation of Ohio Application September 21, 1953, Serial No. 381,175

2 Claims. (Cl. 43—44.87)

The present invention relates to a fishing float and it consists in the combinations, constructions and arrangements of parts herein described and claimed.

Generally there is provided a spherical float which is composed of two semi-spherical portions. The two portions of the float are interconnected by a pair of telescoping and sealed hollow tubular members in one of which is mounted a plunger which is normally urged outwardly by a spring. A shaft extends centrally through the tubular members and through the plunger and is provided with a hook at each end thereof. The free end of one of the hooks normally extends into an opening provided in the outer end of the plunger while the free end of the other hook extends normally through an opening in the adjacent semi-spherical portion of the float. The device is such that the plunger and its adjacent hook may be pressed inwardly into the spherical float to thus release the hook at the opposite end whereby a lead line extending to a conventional sinker may be attached thereto. Inward pressure upon the plunger alone while holding the opposite hook will release the free end of the hook associated with the plunger whereby the conventional fishing line may be attached thereto. The device is of such nature that it eliminates the twisting of the fishing line when casting or still fishing. Another feature of the invention is the feature of a plug in the float whereby water may be admitted or discharged from the interior of the float to thereby regulate the depth at which the float rides in the water when in use.

Another object of the invention is to provide a novel fishing float having means whereby fishing lines attached thereto are prevented from twisting.

Another object of the invention is the provision, in a device of the character set forth, of novel means for attaching a fishing line and lead line thereto.

A further object of the invention is the provision, in a device of the character set forth, of novel releasing means for a pair of line fasteners forming a part of the invention.

Other and further objects of the invention will become apparent from a reading of the following specification taken in conjunction with the drawings, in which:

Figure 1 is a perspective view of an embodiment of the invention,

Figure 2 is a vertical sectional view, somewhat enlarged, of the device shown in Figure 1, Figure 3 is a view similar to Figure 2 but illustrating the manner of releasing a fastening hook forming a part of the invention, Figure 4 is a fragmentary bottom plan view of Figure 2, Figure 5 is a fragmentary sectional view taken along line 5—5 of Figure 4, Figure 6 is a fragmentary sectional view taken along line 6—6 of Figure 4, Figure 7 is a side elevational view, partly broken away, illustrating a novel plug forming a part of the invention, Figure 8 is a sectional view taken along line 8—8 of Figure 7, Figure 9 is an enlarged fragmentary sectional view illustrating a novel joint forming a part of the invention, and Figure 10 is an elevational view illustrating the manner of attachment of a fishing line and lead line to the device of the present invention.

Referring more particularly to the drawings, there is shown therein a hollow float which is generally indicated at 10 and which is composed of an upper semi-spherical portion 11 and a lower semi-spherical portion 12. The abutting edges of the portions 11 and 12 are each provided with registering stepped faces 13 and 14, respectively, which are cemented or otherwise attached to each other, as indicated at 15 in Figure 9. A plug 16 formed of plastic, rubber or the like and provided with a handle 17 is removably mounted in an opening 18 located in any suitable portion of the composite sphere 10, as for example, in the equatorial portion thereof as shown in Figure 1.

A hollow tube 19 extends upwardly from the central portion of the bottom of the portion 12 while a hollow tube 20 extends downwardly from the central portion of the upper member 11 into the upper end of the tube 19 where it is sealed thereto, as for example by cementing as indicated at 21. The tube 20 is provided with an enlarged portion 22 at its upper end for the slidable reception therein of a plunger 23. A compression spring 24 bears against a shoulder 25 formed in the lower end of the enlarged portion 22 and against the underside of the plunger 23.

To the underside of the plunger 23 there is centrally affixed an elongated hollow guide tube 25' which extends downwardly and slidably through the tube 20 into the tube 19. A shaft 26 extends through a central opening 27 in the plunger 23, through the guide tube 25' and through a central opening 28 in the lower member 12.

A fastener hook 29 is provided at the upper end of the shaft 26 while a fastener hook 30 is provided at the lower end thereof. An opening 31 is provided in the outer end of the plunger 23 for the normal reception of the free end of the hook 29 while an opening 32 is provided in the lower end of the member 12 for the normal reception of the free end of the hook 30. A shallow indentation 33 is provided in the outer face of the lower member 12 adjacent the opening 28 for the temporary reception therein of the free end of the hook 30, as illustrated in Figure 6.

In operation, it will be apparent that a fish line 34 may be attached to the fastener hook 29 while a lead line 35 may be attached at one of its ends to the fastener hook 30 while its other end may be connected to a sinker 36 which is, in turn, connected to the conventional lead 37 and fishing hook 38. The depth at which the float 10 will rest in the water may be regulated by admitting more or less water through the opening 18 by the removal of the plug 16 by means of the handle 17 after which the plug may be replaced. In order to release the hook 30 from its engagement in the opening 32 in order to fasten the lead line 35 thereto, it is only necessary to press down upon the plunger 23 and the hook 29 thus forcing the shaft 26 downwardly to thereby release the hook 30.

For convenience, the free end of the hook 30 may then be placed in the shallow indentation 33 while the lead line 35 is being tied thereto after which the free end thereof may be again allowed to pass into the opening 32 to securely hold the lead line 35 thereon. To release the hook 29, it is only necessary to hold the hook 30 in its normal position while moving the plunger 23 downwardly as viewed, for example, in Figure 2, thus releasing the hook 29 so that the fishing line 34 may be attached thereto. It will be seen that the guide tube 25' will act to maintain the plunger 23 in properly aligned position at all times since the tube 25 is slidably arranged in the tube 20. It will also be seen that water which may enter through the openings 28, 32 or around the plunger 23 will not affect the buoyancy of the float 10 in any manner since the tubes 19 and 20 together with the enlarged portion 22 of the latter are completely sealed from the interior of the float 10.

It is readily apparent that the float may be clamped to a single length of line by passing the line successively through the hook 29, then longitudinally about the float body and through the lower hook 30, said line being clamped in frictional engagement between the bight portions of said hooks and the cooperating portions of the float.

It is further evident that the hook 30 in the position of Fig. 6 provides clearance for a line passing between the bight of said hook and the float body, whereby said float may be slidably mounted on the line if so desired.

The portions 11 and 12 of this embodiment of the invention are made of plastics, either transparent or colored, or such other material as may be preferred.

While but one form of the invention has been shown and described herein, it will be readily apparent to those skilled in the art that many minor modifications may be made without departing from the spirit of the invention or the scope of the appended claims.

What is claimed is:

1. A device of the character described comprising a hollow float body divided into a pair of complementary members, each of said members having a centrally disposed integral sleeve-like projection, one of said projections extending inwardly and beyond the center of said float body to provide overlapping engagement with the free end portion of the other of said projections, one of said projections having an enlarged portion at one end thereof to provide a recess forming a socket for receiving a coil spring, a cap member extending substantially over said spring and having a concentrically positioned integral elongated guide tube slidably mounted and closely fitted in at least one of said sleeve-like projections and extending through said spring providing continuous axial alignment for said cap member and said spring, a shaft extending through said cap member, said guide tube and said projections, and a hook formed integrally with each end of said shaft, one of said projections having an end wall, said wall having a first opening therethrough for the slidable reception of said shaft, said wall having a second opening eccentrically positioned with respect to said first opening, said cap member having a first opening therethrough for the slidable reception of said shaft, said cap member having a second opening eccentrically positioned with respect to its first opening, said hooks having their free ends receivable in said eccentric openings, whereby the free ends of said hooks may be selectively positioned in said eccentric openings, the outer side of said end wall and said cap member being urged toward the bight portions of the respective hooks, said bight portions being adapted to receive a fishing line for interchangeably clamping and slidably mounting the float body on the fishing line.

2. A device of the character described comprising a hollow float body divided into a pair of complementary members, each of said members having a centrally disposed sleevelike projection and joined at their inner ends in sealing engagement, one of said projections having an enlarged portion at one end thereof to provide a recess forming a socket for receiving a coil spring, a cap member, said cap member having an integral guide tube slidably mounted in at least one of said sleeve-like projections providing axial alignment for said cap member and said spring, a shaft extending loosely through said cap member, said guide tube and said projections, and a hook formed integrally with each end of said shaft, one of said projections having an end wall, said wall having a first opening therethrough for the slidable reception of said shaft, said wall having a second opening eccentrically positioned with respect to said first opening, said cap member having a first opening therethrough for the slidable reception of said shaft, said cap member having a second opening eccentrically positioned with respect to its first opening, said hooks having their free ends receivable in said eccentric openings, whereby the free ends of said hooks may be selectively positioned in said eccentric openings with the bight portions of said hooks overlying the outer side of said end wall and said cap member, said spring normally urging said float body and cap member apart and toward the bight portion of said hooks, said hooks being adapted to selectively receive a fishing line within the bight portions thereof for interchangeably clamping and slidably mounting the float body on the fishing line, and whereby when the cap member is depressed without the depression of the shaft, the hooks on the shaft are exposed and when both the cap member and the shaft are depressed, the hook on the opposite end of the shaft is exposed.

References Cited in the file of this patent

UNITED STATES PATENTS

| | | |
|---|---|---|
| 514,034 | Redfield | Feb. 6, 1894 |
| 2,065,854 | Edel et al. | Dec. 29, 1936 |
| 2,255,853 | Makus et al. | Sept. 16, 1941 |
| 2,415,692 | Huston | Feb. 11, 1947 |
| 2,444,552 | Brantingson | July 6, 1948 |
| 2,501,471 | Larson | Mar. 21, 1950 |
| 2,527,437 | Matras | Oct. 24, 1950 |
| 2,670,560 | Matras | Mar. 2, 1954 |

FOREIGN PATENTS

| | | |
|---|---|---|
| 1,029,714 | France | June 5, 1953 |